US008192831B2

(12) United States Patent
Rosenzweig et al.

(10) Patent No.: US 8,192,831 B2
(45) Date of Patent: Jun. 5, 2012

(54) ARTICLES FOR HIGH TEMPERATURE SERVICE AND METHODS FOR THEIR MANUFACTURE

(75) Inventors: Larry Steven Rosenzweig, Clifton Park, NY (US); James Anthony Ruud, Delmar, NY (US); Mohan Manoharan, Bangalore (IN); Brian Harvey Pilsner, Mason, OH (US)

(73) Assignee: General Electric Company, Niskayuna, NY (US)

( * ) Notice: Subject to any disclaimer, the term of this patent is extended or adjusted under 35 U.S.C. 154(b) by 754 days.

(21) Appl. No.: 12/332,007

(22) Filed: Dec. 10, 2008

(65) Prior Publication Data

US 2010/0143655 A1 Jun. 10, 2010

(51) Int. Cl.
*B32B 3/00* (2006.01)
*B32B 5/16* (2006.01)
*B32B 9/00* (2006.01)
*B32B 19/00* (2006.01)

(52) U.S. Cl. ........ 428/161; 428/156; 428/172; 428/323; 428/328; 428/689; 428/702

(58) Field of Classification Search .................. 428/156, 428/172, 143, 148, 323, 328, 329, 330, 688, 428/689, 697, 338, 699, 701, 702
See application file for complete search history.

(56) References Cited

U.S. PATENT DOCUMENTS 5,941,686 A * 8/1999 Gupta et al. .................. 415/178
6,306,517 B1 10/2001 Gray et al.
6,365,013 B1 * 4/2002 Beele ....................... 204/192.16
7,192,622 B2 3/2007 Fernihough et al.
2004/0229031 A1 11/2004 Gell et al.
2004/0234687 A1 11/2004 Schmid et al.
2007/0259173 A1 11/2007 Refke et al.
2008/0220209 A1 * 9/2008 Taylor et al. .................. 428/134

FOREIGN PATENT DOCUMENTS

EP 1887097 A2 2/2008

OTHER PUBLICATIONS

Kassner et al., "Application of Suspension Plasma Spraying (SPS) for Manufacture of Ceramic Coatings", Journal of Thermal Spray Technology, vol. 17, No. 1, pp. 115-123, Mar. 2008.
Gell et al., "Highly Durable Thermal Barrier Coatings Made by the Solution Precursor Plasma Spray Process", Surface and Coatings Technology, vols. 177-178, pp. 97-102, 2004.
Van Every et al., "Study of Suspension Plasma Sprayed Coatings for Thermal Barrier Applications", 32nd International Conference on Advanced Ceramics and Composites, Daytona Beach, 29 pages, Jan. 27-Feb. 1, 2008.
Refke et al., "LPPS Thin Film Technology for the Application of TBC Systems", International Thermal Spray Conference, Basel, Switzerland, 6 pages (plus cover sheet), May 2-4, 2005.

(Continued)

*Primary Examiner* — Catherine A Simone
(74) *Attorney, Agent, or Firm* — Paul J. DiConza

(57) ABSTRACT

Articles coated via a plasma spray process, and methods for making such articles, are presented. For example, one embodiment is an article comprising a substrate comprising a top surface and a channel disposed in the substrate. The channel is defined by an internal channel surface disposed beneath the top surface and having a terminal end at an orifice at the top surface. A coating is disposed on the top surface and on at least a portion of the internal channel surface. A coating thickness at any point on the internal channel surface is less than a nominal coating thickness on the top surface, and the coating comprises a plurality of at least partially melted and solidified particles.

19 Claims, 2 Drawing Sheets

OTHER PUBLICATIONS

Refke et al., "LPPS Thin Film: A Hybrid Coating Technology Between Thermal Spray and PVD for Functional Thin Coatings and Large Area Applications", Proceedings of the 2007 International Thermal Spray Conference, Bejing, China, pp. 705-710, May 14-17, 2007.

* cited by examiner

ARTICLES FOR HIGH TEMPERATURE SERVICE AND METHODS FOR THEIR MANUFACTURE

BACKGROUND

This invention relates to high-temperature machine components. More particularly, this invention relates to coating systems for protecting machine components from exposure to high-temperature environments. This invention also relates to methods for protecting articles.

The components of gas turbine assemblies and other industrial equipment can be exposed to gas temperatures in excess of 1350° C. Accordingly, such components are designed to reliably perform their functions within this aggressive service environment, often employing a combination of strategies to prolong nominal service time at temperature. For instance, high temperature materials such as superalloys are often employed in turbine assembly components exposed to the flow of hot gas. Additionally, thermal barrier coating systems, generally comprising an oxidation-resistant metallic "bondcoat" disposed on the component surface and a heat-resistant ceramic "topcoat" disposed over the bondcoat, are often used to maintain somewhat reduced temperatures in the underlying component material. Furthermore, such components often employ cooling systems that may include complex arrangements of internal cooling channels that receive air or other cooling fluid and circulate the fluid throughout the component to maintain its temperature at an acceptable level. The internal cooling channels may connect to the outer surface of a component through multiple orifices, often referred to as "cooling holes," dispersed over the surface. In some cases these cooling holes may allow the exiting fluid to form a film over at least a portion of the surface and thereby provide cooling or insulation to the surface ("film cooling"). In other cases, the flow of air or other fluid out of cooling holes is used to provide cooling by convection or impingement cooling.

Thermal barrier coatings are deposited using a variety of techniques, including physical vapor deposition (PVD) and air plasma spraying (APS). APS is much more economical than PVD due to its much higher nominal deposition rates and less expensive capital equipment requirements. However, it is known that conventional APS techniques frequently produce clogging of cooling holes, and thus in many applications, particularly those with fine cooling holes on the order of 1 mm and smaller, the more expensive PVD techniques are required to adhere to critical cooling hole flow specifications. Even components with larger cooling holes that are coated via APS often require post-coating processing to clear holes clogged by the spray process.

There is thus a need for economical coating processes that allow economical coating application using spray techniques while avoiding or minimizing the problem of cooling hole clogging, and for components having durable, reliable economical coatings with minimized restrictions in cooling fluid flow from their cooling holes.

BRIEF DESCRIPTION

Embodiments of the present invention are provided to meet this and other needs. One embodiment is an article comprising a substrate comprising a top surface and a channel disposed in the substrate. The channel is defined by an internal channel surface disposed beneath the top surface and having a terminal end at an orifice at the top surface. A coating is disposed on the top surface and on at least a portion of the internal channel surface. A coating thickness at any point on the internal channel surface is less than a nominal coating thickness on the top surface, and the coating comprises a plurality of at least partially melted and solidified particles.

Another embodiment is a component for a turbine assembly. The component comprises a substrate comprising a top surface and an internal cooling system. The cooling system comprises a plurality of channels disposed in the substrate at a non-zero angle relative to a normal to the top surface, and each channel is defined by an internal channel surface disposed beneath the top surface and having a terminal end at an orifice at the top surface. A coating is disposed on the top surface and on at least a portion of the internal channel surfaces; a coating thickness at any point on the internal channel surfaces is less than a nominal coating thickness on the top surface. The coating comprises a plurality of at least partially melted and solidified particles.

Another embodiment is a method comprising: providing a substrate comprising a top surface and a channel disposed in the substrate, the channel defined by an internal channel surface disposed beneath the top surface and having a terminal end at a orifice at the top surface; providing a particulate coating feedstock material, wherein the feedstock material has a median particle diameter less than about 4 micrometers; and disposing a coating on the top surface and internal channel surface, using the feedstock in a plasma spray process, wherein a coating thickness at any point on the internal channel surface is less than a nominal coating thickness on the top surface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include articles having coatings deposited via spray techniques (including, for instance, APS and other thermal and plasma spray processes), wherein the coatings, even in the as-produced condition, are situated in a form that does not unduly restrict holes in the top (coated) surfaces of the articles, in contrast to the undue restrictions observed for conventional spray processes. Articles and methods described herein are particularly useful in, though not restricted to, high temperature applications where minimally restricted cooling holes are desired.

Figure 1:
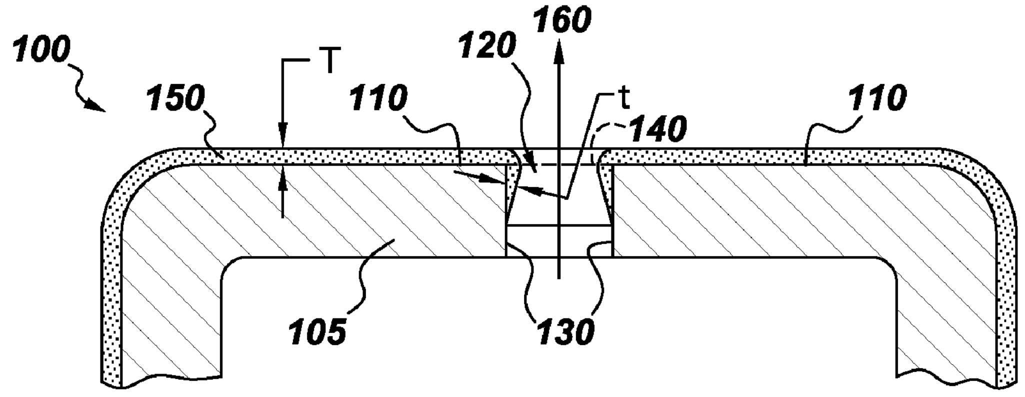
FIG. 1 is a schematic cross section illustrating one embodiment of the present invention.

In one embodiment, illustrated schematically in cross-section by FIG. 1, the article 100 comprises a substrate 105, which in turn comprises a top surface 110 and at least one channel 120 disposed in the substrate 105. Channel 120 is defined by an internal channel surface 130 disposed beneath top surface 110. Channel 120 terminates at top surface 110 at an orifice 140. Orifice 140, in some embodiments, is a cooling hole of typical size used in the fabrication of gas turbine components. In some embodiments, orifice 140 has a diameter of up to about 2.5 millimeters. In certain embodiments, this diameter is up to about 1.25 millimeters, and in particular embodiments, the diameter is up to about 0.8 millimeter.

In some embodiments, article 100 further comprises an internal cooling system (not shown) and channel 120 makes up a part of the cooling system by defining a flow path 160 for a fluid. Generally, during operation, the flow path 160 used to cool article 100 is directed from within article 100, outward through channel 120 with an exit at orifice 140. For example, where article 100 is a component of a gas turbine assembly, such as a rotating airfoil, a stationary airfoil, a shroud, a combustion liner, or a combustor splash plate, air or other cooling fluid is directed from a compressor into the cooling system, where the fluid is distributed throughout the cooled parts and, consequently, is in part directed through channel 120 and out through orifice 140. In particular embodiments, top surface 110 comprises a plurality of channels 120, for example to distribute cooling fluid over top surface 110.

A coating 150 is disposed on top surface 110 and on at least a portion of internal channel surface 130. A coating thickness (designated "t" in FIG. 1) at any point on internal channel surface 130 is less than a nominal coating thickness (designated "T" in FIG. 1) on top surface 110. In the exemplary embodiment shown in FIG. 1, the coating on internal channel surface 130 is tapered, meaning that it has a thickness that continuously and monotonically decreases as a function of distance moving away from top surface 110, but this illustration is merely an example and should not be understood to limit the invention in any way. In some embodiments, the thickness T is up to about 0.8 millimeters.

Coating 150 is deposited by spray techniques, as will be described further below. Consequently, coating 150 comprises a unique structure that distinguishes it from a coating deposited by PVD or other methods that do not involve spraying. In particular, coating 150 comprises a plurality of at least melted and solidified particles. This sprayed structure is generally easily recognized by those skilled in the art.

In some embodiments, coating 150 comprises a ceramic material, a metal material, or a composite material. It may be a single layer coating, a multi-layered coating, or a graded coating. Typical examples of ceramic materials suitable for use in embodiments of the present invention include oxides, nitrides, and carbides. Oxides in particular have found applications in thermal barrier coating systems, and thus are applicable where article 100 needs protection from high temperature service environments. Oxides suitable for use as thermal barrier coatings include zirconia and zirconates. Stabilized oxides, such as stabilized zirconia, have been shown to be especially suitable thermal barrier coating materials, though embodiments of the present invention are not limited to these materials. Examples of metals suitable for use in embodiments of the present invention include metals comprising aluminum or nickel, due to the advantageous properties these elements provide in high temperature alloys. In some embodiments, such as (but not limited to) where coating 150 is a thermal barrier coating, the metal is a bondcoat material, such as an aluminide or an MCrAlY material (where M can be iron, nickel, or cobalt, alone or in any combination). Examples of composite materials include, without limitation, cermet materials (composites comprising ceramic and metal materials), such as those widely used to provide wear resistance. Examples of cermet materials include tungsten carbide-cobalt materials and chromium carbide-nickel/chromium materials, where the hard ceramic phase provides wear resistance and the metal matrix provides toughness.

In general, coatings deposited by APS and other spray techniques can have various microstructural features, depending in large part to a host of processing variables. For instance, in certain embodiments the coating 150 may be applied in accordance with processes described in commonly owned, co-pending U.S. patent application Ser. No. 12/115,819, hereby incorporated by reference in its entirety; as such coating 150 in this embodiment has one of the structures described therein. For example, the coating may have a plurality of elongate material growth domains defined between domain boundaries, wherein the domains have an intra-domain density of at least about 75%, and have a substantially equiaxed grain morphology. In another example, the coating 150 may have a substantially equiaxed grain morphology; and a plurality of vertically oriented cracks disposed in the matrix. Other structures, of course, may be obtained by varying processing parameters according to principles well known in the art.

Figure 2:
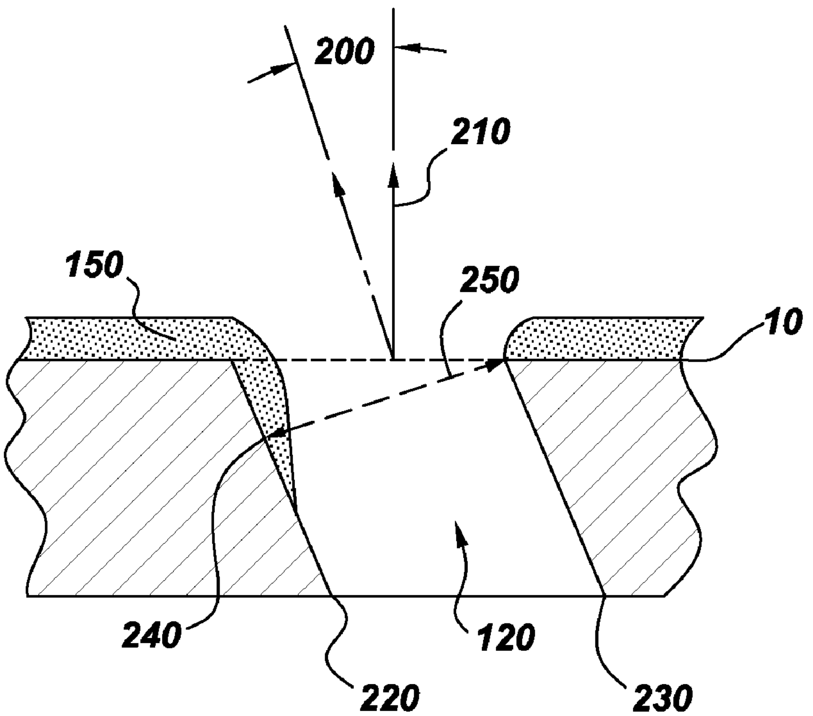
FIG. 2 is a schematic cross section of another embodiment of the present invention.

Cooling holes, especially those employed to provide film cooling, often are associated with angled channels so that air or other fluid flowing out of the holes has a significant flow motion component that is parallel to the surface of the part. Accordingly, in some embodiments, as illustrated in FIG. 2, channel 120 is disposed at a non-zero angle 200 relative to a normal 210 to top surface 110. Due to the "line-of-sight" nature of plasma spray deposition, the angled disposition of channel 120 will typically have a coated side 220 and an uncoated side 230. A "throat threshold" 240 can be defined by extending a perpendicular line from the uncoated side 230 at top surface 110 to the coated side 220. In some embodiments the coating 150 disposed on the internal channel 120 from the top surface 110 to the throat threshold 240 has a tapered thickness. In certain embodiments, the thickness of the coating 150 at the throat threshold 240 is less than about 20%, and in some embodiments, less than about 10%, of the channel diameter 250. A small coating thickness at a throat threshold may be desirable to avoid unduly restricting cooling air flow through the channels.

In some embodiments, coating 150 disposed on internal channel surface 130 is in an as-produced condition, meaning that the coating 150 in this area has not been subjected to any sort of material removal process. In conventional spray processes, holes are often cleared of obstructing coating material after deposition using various material removal processes such as drilling, punching, air jet impingement, grit blasting, water jet blasting, and the like. Embodiments of the present invention avoid the need for such time consuming and potentially expensive post-processing. Additionally, avoidance of the need for clearing coating from holes eliminates risk of potential damage to oxidation resistant metallic bondcoats disposed onto internal channel surfaces by other methods.

Figure 3:
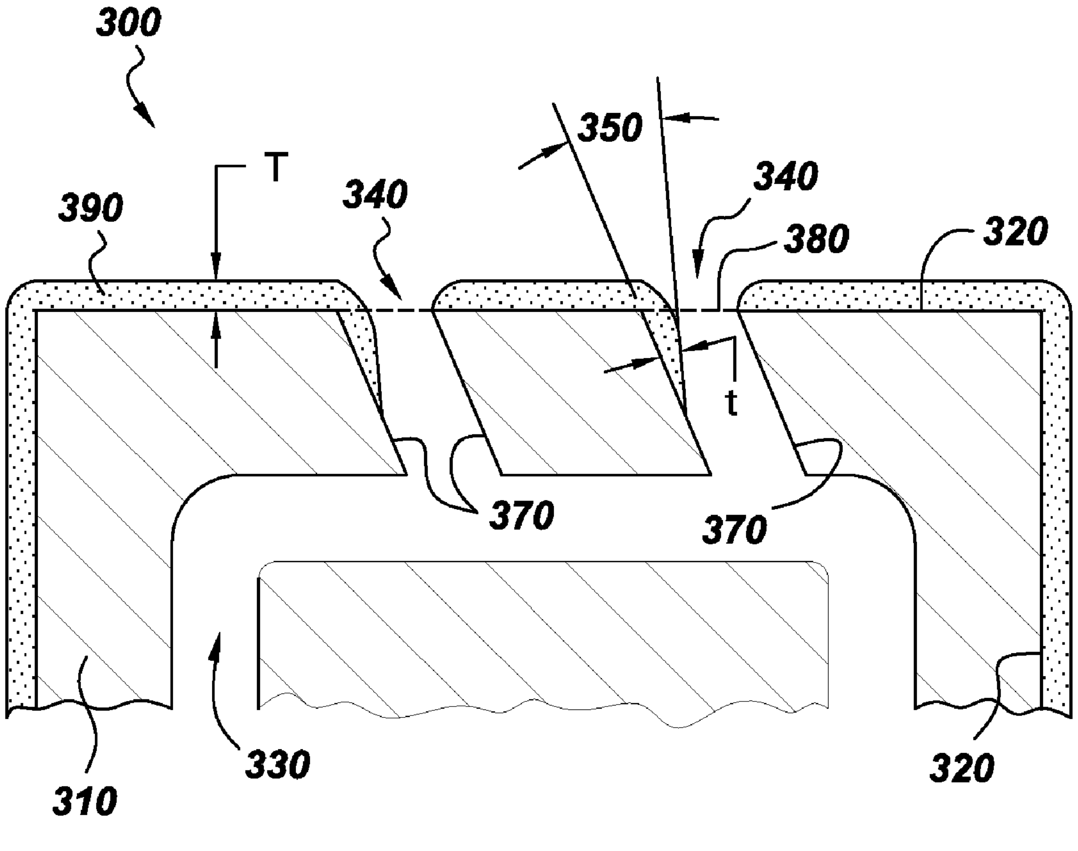
FIG. 3 is a schematic cross section of a further embodiment of the present invention.

In one particular embodiment, illustrated in FIG. 3, a component 300 for a turbine assembly comprises a substrate 310 comprising a top surface 320 and an internal cooling system 330, the cooling system 330 comprising a plurality of channels 340 disposed in the substrate 310 at a non-zero angle 350 relative to a normal 360 to the top surface 320, each channel 340 defined by an internal channel surface 370 disposed beneath the top surface 320 and having a terminal end at an orifice 380 at the top surface; and a coating 390 disposed on the top surface 320 and on at least a portion of the internal channel surfaces 370, wherein a coating thickness "t" at any point on the internal channel surfaces 370 is less than a nominal coating thickness "T" on the top surface 320, and wherein the coating 390 comprises a plurality of at least partially melted and solidified particles.

Articles according to certain embodiments of the present invention thus may have as-produced sprayed-on coatings that do not unduly restrict the flow of cooling fluid through internal channels 120. As an example, in some embodiments coating 150 disposed on the internal channel surface 120 has a thickness such that an air flow through channel 120 out of orifice 140 is at least about 80% of the air flow obtained through an uncoated channel of substantially identical channel dimensions, for similar air flow conditions (i.e., same temperature and pressure of air). Such advantageous results may be obtained without the need for post-spray removal of coating material from the holes, when coatings are applied using the methods described herein.

In one embodiment of the present invention, a method for fabricating article 100 includes providing a substrate 105 as described previously. A particulate coating feedstock material is provided. The feedstock material has a median particle diameter less than about 4 micrometers. In some embodiments, the median particle diameter is less than 2 micrometers and in particular embodiments is less than 1 micrometer. The present inventors have found that, contrary to what has been observed for conventional plasma spray processes, when particle sizes in the feedstock are controlled to the described size range, the tendency for deposited coating material to clog small orifices, such as cooling holes, in the top surface is drastically diminished to the point where the holes may be used for cooling (i.e., air flows through the holes are sufficient to meet design specifications) even where coatings remain in the as-produced condition, without the need for post processing steps as described above. The feedstock may be supplied using a gaseous carrier, or, in cases where the feedstock is especially fine in size, a liquid carrier may be employed.

EXAMPLES

The following examples are presented to further illustrate embodiments of the present invention and are not intended to limit the scope of any concept described above.

Example 1

An yttria-stabilized-zirconia (YSZ) coating was produced on a nominal 1.6 millimeter thick plate of a cobalt-based superalloy substrate using a Mettech Axial III DC plasma torch. Prior to coating deposition, the substrate was laser drilled to obtain 10 rows of 10 through holes each of nominally 508 micron (0.020 inch) diameter at an angle of 30 degrees relative to the top surface of the plate. Each laser drilled hole was spaced approximately 3 mm from an adjacent hole. The plate was deburred and abrasive blasted using 220 mesh aluminum oxide prior to coating. The feedstock material used to produce the coating was an 8 wt % YSZ powder with a d50 of 0.4 mm suspended in ethanol at 10 wt % using polyethyleneimine as a dispersant (at 0.2 wt % of the solids). The suspension was injected into the plasma torch through the center tube of a tube-in-tube atomizing injector with a nitrogen atomizing gas sent through the outer tube. The torch power was about 90 kW using an electrode current of 190 amps per electrode and a total plasma gas flow of 200 standard liters per minute (slpm) consisting of 60% argon, 30% nitrogen, and 10% hydrogen. The plasma torch was rastered across the substrate at 600 mm/sec using path spacing of 2 millimeters while maintaining a constant spray distance of 76 mm distance between the torch nozzle and substrate.

Cross-sections were taken through the center of several holes, oriented parallel to the long axis of the elliptical shaped exit and polished to reveal the coating microstructure and thickness profiles. An average coating thickness of 222 micrometers was measured on the top surface of the plate. A tapered coating profile was produced from the top coated surface extending into the hole opening, where the maximum thickness of the TBC coating was located on the top surface at the exit of the hole. The coating thickness measured at the throat threshold of the hole was 7% of the channel diameter.

Example 2

As in example 1, a YSZ coating was deposited onto a similarly prepared laser drilled cobalt alloy plate. Feedstock was the same as in example 1. Plasma parameters used to produce coatings in this example were a total torch power of 90 kW obtained using an electrode current of 200 amps per electrode and a total plasma gas flow of 245 slpm consisting of 75% argon, 10% nitrogen, and 15% hydrogen. The plasma torch was rastered across the substrate at 600 mm/sec while maintaining a constant spray distance of 76 mm distance between the torch nozzle and substrate. An average coating thickness of 100 micrometers was obtained on the top surface of the plate. As in example 1, a tapered coating profile was produced from the top coated surface extending into the holes. The coating thickness measured at the throat threshold of the hole was 4% of the channel diameter.

Example 3

Plasma parameters were the same as in example 2, except that a spray distance of 50 millimeters was used. An average coating thickness of 140 micrometers was obtained on the top surface of the plate. As in examples 1 and 2, a tapered coating profile was produced from the top coated surface extending into the holes. The coating thickness measured at the throat threshold of the hole was 9% of the channel diameter.

Example 4

In another example, a YSZ coating was produced using the same feedstock and substrates as in examples 1 through 3. A plasma torch power of 122 kW was used with 200 amp current, and 235 slpm total gas flow composed of 30% argon, 70% nitrogen, and 10% hydrogen. A torch-to-substrate spray distance of 76 millimeters was maintained as the plasma torch was rastered over the surface at 800 mm/sec. An average coating thickness of 144 microns was produced on the top surface of the cooling hole plate and a tapered coating thickness profile inside the hole. The coating thickness measured at the throat threshold of the hole was 8% of the channel diameter.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An article comprising:

a substrate comprising a top surface and a channel disposed in the substrate, the channel defined by an internal channel surface disposed beneath the top surface and having a terminal end at an orifice at the top surface; and a coating disposed on the top surface and on at least a portion of the internal channel surface, wherein a coating thickness at any point on the internal channel surface is less than a nominal coating thickness on the top surface, and wherein the coating comprises a plurality of at least partially melted and solidified particles, and wherein the coating comprises a plurality of elongate material growth domains defined between domain boundaries, wherein the domains have an intra-domain density of at least about 75%, and have a substantially equiaxed grain morphology.

2. The article of claim 1, wherein the channel is disposed at a non-zero angle relative to a normal to the top surface.

3. The article of claim 2, wherein the coating disposed on a portion of the internal channel extending from the top surface to a throat threshold has a tapered thickness.

4. The article of claim 2, wherein a thickness of the coating disposed at a throat threshold is less than about 10% of a channel diameter.

5. The article of claim 1, wherein the orifice has a diameter of up to about 2.5 millimeters.

6. The article of claim 1, wherein the orifice has a diameter of up to about 1.25 millimeters.

7. The article of claim 1, wherein the coating comprises a ceramic material or a metal material.

8. The article of claim 7, wherein the ceramic material comprises material selected from the group consisting of stabilized zirconia, zirconates, and stabilized oxides.

9. The article of claim 7, wherein the metal material comprises aluminum, nickel, McrAl Y, or an aluminide material.

10. The article of claim 7, wherein the coating comprises a composite material, the composite comprising a metal and a ceramic.

11. The article of claim 1, wherein the nominal coating thickness on the top surface is up to about 0.8 millimeters.

12. The article of claim 1, further comprising an internal cooling system comprising the channel, wherein the channel defines a flow path for a fluid.

13. The article of claim 12, wherein the coating disposed on the internal channel surface has a thickness such that an air flow through the channel out of the orifice is at least about 80% of an air flow through an uncoated channel of substantially identical channel dimensions for similar air flow conditions.

14. The article of claim 1, wherein the top surface comprises a plurality of the channels.

15. The article of claim 1, wherein the article is a component of a gas turbine assembly.

16. The article of claim 15, wherein the article is a rotating airfoil, a stationary airfoil, a shroud, a combustion liner, or a combustor splash plate.

17. The article of claim 1, wherein the coating disposed on the internal channel surface is in an as-produced condition.

18. A component for a turbine assembly, comprising:

a substrate comprising a top surface and an internal cooling system, the cooling system comprising a plurality of channels disposed in the substrate at a non-zero angle relative to a normal to the top surface, each channel defined by an internal channel surface disposed beneath the top surface and having a terminal end at an orifice at the top surface; and a coating disposed on the top surface and on at least a portion of the internal channel surfaces, wherein a coating thickness at any point on the internal channel surfaces is less than a nominal coating thickness on the top surface, and wherein the coating comprises a plurality of at least partially melted and solidified particles, and wherein the coating comprises a plurality of elongate material growth domains defined between domain boundaries, wherein the domains have an intra-domain density of at least about 75%, and have a substantially equiaxed grain morphology.

19. An article comprising:

a substrate comprising a top surface and a channel disposed in the substrate, the channel defined by an internal channel surface disposed beneath the top surface and having a terminal end at an orifice at the top surface; and a coating disposed on the top surface and on at least a portion of the internal channel surface, wherein a coating thickness at any point on the internal channel surface is less than a nominal coating thickness on the top surface, and wherein the coating comprises a plurality of at least partially melted and solidified particles, and wherein the coating comprises a matrix comprising a substantially equiaxed grain morphology; and a plurality of vertically oriented cracks disposed in the matrix.

* * * * *

UNITED STATES PATENT AND TRADEMARK OFFICE

CERTIFICATE OF CORRECTION

PATENT NO. : 8,192,831 B2
APPLICATION NO. : 12/332007
DATED : June 5, 2012
INVENTOR(S) : Rosenzweig et al.

It is certified that error appears in the above-identified patent and that said Letters Patent is hereby corrected as shown below:

On Page 2, in Field (56), under "OTHER PUBLICATIONS" in Column 2, Line 1, delete "Bejing," and insert -- Beijing, --, therefor.

In Fig. 2, Sheet 1 of 2, delete Tag "10" and insert Tag -- 110 --, therefor.

In Column 7, Line 19, in Claim 9, delete "McrAl Y," and insert -- MCrAlY, --, therefor.

Signed and Sealed this
Twenty-fourth Day of July, 2012

David J. Kappos
*Director of the United States Patent and Trademark Office*